United States Patent
Kim et al.

(10) Patent No.: US 10,614,314 B2
(45) Date of Patent: Apr. 7, 2020

(54) IMAGE SUMMARIZATION SYSTEM AND METHOD

(71) Applicant: KT Corporation, Seongnam-si (KR)

(72) Inventors: Kwang Jung Kim, Bucheon-si (KR); Tae Heon Park, Seoul (KR); Jae Cheol Kwon, Sejong-si (KR); Bong-Ki Kim, Cheongju-si (KR); Mi-Sook Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 16/314,529

(22) PCT Filed: Jun. 30, 2017

(86) PCT No.: PCT/KR2017/006960
§ 371 (c)(1),
(2) Date: Dec. 31, 2018

(87) PCT Pub. No.: WO2018/004299
PCT Pub. Date: Jan. 4, 2018

(65) Prior Publication Data
US 2019/0180111 A1 Jun. 13, 2019

(30) Foreign Application Priority Data
Jun. 30, 2016 (KR) .................. 10-2016-0082957

(51) Int. Cl.
*G06K 9/00* (2006.01)
*H04N 21/8405* (2011.01)
(Continued)

(52) U.S. Cl.
CPC ..... *G06K 9/00751* (2013.01); *G06K 9/00765* (2013.01); *G06K 9/00771* (2013.01);
(Continued)

(58) Field of Classification Search
CPC .......... G06K 9/00751; G06K 9/00765; G06K 9/00771; G11B 27/005; G11B 27/031;
(Continued)

(56) References Cited

U.S. PATENT DOCUMENTS

| 10,319,410 | B1 * | 6/2019 | Townsend ............ G11B 27/034 |
| 2004/0207656 | A1 | 10/2004 | Sang-Youn et al. |
| 2015/0104149 | A1 * | 4/2015 | Sim ...................... G11B 27/031 386/241 |

FOREIGN PATENT DOCUMENTS

| KR | 10-1251304 B1 | 4/2013 |
| KR | 10-1294498 B1 | 8/2013 |

(Continued)

OTHER PUBLICATIONS

International Search Report for PCT/KR2017/006960 dated Oct. 25, 2017 [PCT/ISA?210].

*Primary Examiner* — Huy T Nguyen
(74) *Attorney, Agent, or Firm* — Sughrue Mion, PLLC

(57) ABSTRACT

To summarize an input image, an image summarization system extracts a background frame and object information of each of objects from an image stream, and receives a region of interest set in a predetermined region of the background frame. The image summarization system selects the extracted objects as queue objects, and generates a summarized video based on the queue object, the background frame, and the region of interest.

19 Claims, 14 Drawing Sheets

(51) Int. Cl.
  *H04N 21/8549*   (2011.01)
  *H04N 21/8543*   (2011.01)
  *H04N 21/2343*   (2011.01)
  *H04N 21/2187*   (2011.01)
  *H04N 21/234*    (2011.01)
  *G11B 27/00*     (2006.01)
  *G11B 27/031*    (2006.01)
  *G11B 27/22*     (2006.01)
  *G11B 27/34*     (2006.01)

(52) U.S. Cl.
  CPC .......... *G11B 27/005* (2013.01); *G11B 27/031* (2013.01); *G11B 27/22* (2013.01); *G11B 27/34* (2013.01); *H04N 21/2187* (2013.01); *H04N 21/23418* (2013.01); *H04N 21/234318* (2013.01); *H04N 21/8405* (2013.01); *H04N 21/8543* (2013.01); *H04N 21/8549* (2013.01)

(58) Field of Classification Search
  CPC .... G11B 27/22; G11B 27/34; H04N 21/2187; H04N 21/23418; H04N 21/234318; H04N 21/8405; H04N 21/8543; H04N 21/8549
  See application file for complete search history.

(56) References Cited

FOREIGN PATENT DOCUMENTS

| KR | 10-2014-0040342 A | 4/2014 |
| KR | 10-2015-0026178 A | 3/2015 |
| KR | 10-2015-0084567 A | 7/2015 |
| KR | 10-2015-0086723 A | 7/2015 |

\* cited by examiner

Region of interest

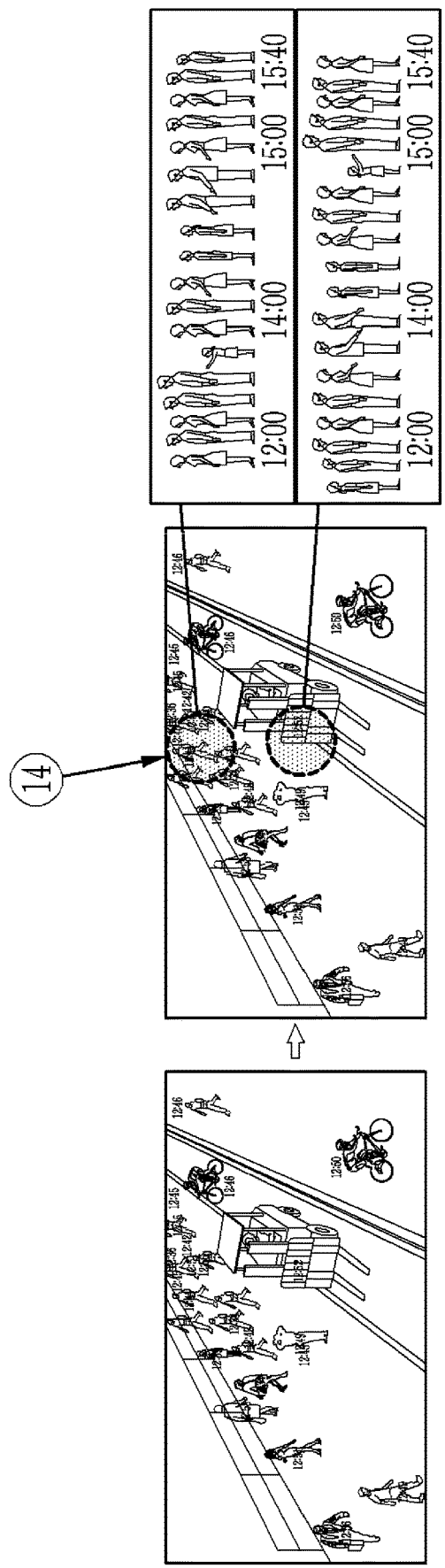

IMAGE SUMMARIZATION SYSTEM AND METHOD

CROSS REFERENCE TO RELATED APPLICATIONS

This application is a National Stage of International Application No. PCT/KR2017/006960 filed Jun. 30, 2017, claiming priority based on Korean Patent Application No. 10-2016-0082957 filed Jun. 30, 2016.

TECHNICAL FIELD

The present invention relates to an image summarization system and a method.

BACKGROUND ART

A lot of CCTVs for crime prevention have been installed to solve the anxiety of citizens from the rapidly increasing crime and to prevent the crime. The CCTV not only plays a crucial role in crime prevention and criminal arrest and evidence securing, but also may be used in various marketing activities.

Since most CCTVs are based upon the principle of real-time recording, a recorded version of the previous day is stored and managed as a 24-hour image. However, since it is very difficult to check a whole image taken for 24 hours, a situation of the previous day is confirmed by a summarization version of a recorded image.

Accordingly, a variety of image summarization methods are presented and may be largely classified into three methods. As a first method, there is a method for reducing an image length by just skipping an entire image by N frame units. As a second method, there is a method for extracting only images in which an event occurs and as a last method, there is a summarization method for extracting and showing an object.

In the case of summarizing an image using the methods in the related art, since the image is a simple summarized video in which a range (e.g., an image speed, the number of displayed objects, etc.) which a user who confirms the image may examine is not considered, there is a problem in that the user should repeatedly watch the image while moving the image back and forth. In addition, in order to obtain results such as an event (e.g., an access event, object analysis/count, etc.), object information, and search, etc., information should be obtained by accessing an original image, and as a result, there is a drawback that the original image having a large capacity should be particularly stored and kept.

DISCLOSURE

Technical Problem

Accordingly, the present invention has been made in an effort to provide image summarization system and a method according to event and object data, and providing a highly visible summarized image through various settings.

Technical Solution

An exemplary embodiment of the present invention provides a method for summarizing an input image by an image summarization system. The method includes extracting a background frame and object information of each of objects from an image stream; receiving a region of interest set in a predetermined region of the background frame; selecting extracted objects as a queue object; and generating a summarized video based on the queue object, the background frame, and the region of interest.

Another exemplary embodiment of the present invention provides a system for summarizing an input image. The system includes a memory storing an image summarization program; and a processor executing the image summarization program in link with the memory, in which the processor generates a summarized video based on a queue object for objects extracted from an image stream and a background frame extracted from the image stream, and a region of interest set in a predetermined region of the background frame.

Advantageous Effects

According to an exemplary embodiment of the present invention, since a security control personnel who need to control CCTV can examine only a region of interest from a plurality of CCTV images in a short time and can set homeostasis of the number of objects to be monitored, a security operation can be effectively processed in a security monitoring field.

In addition, since it is possible to obtain useful marketing information from statistical information such as entrance counts, customer attributes, and customer circulation of customers entering a business space such as a store through a summarized image or a summarized video instead of an original image, efficient summarized image search, efficient summarized video search and saving of a time/storage device can be achieved.

DESCRIPTION OF THE DRAWINGS

FIG. 9 is an exemplary diagram illustrating a method for processing overlapped objects according to an exemplary embodiment of the present invention.

BEST MODE FOR INVENTION

Figure 1:
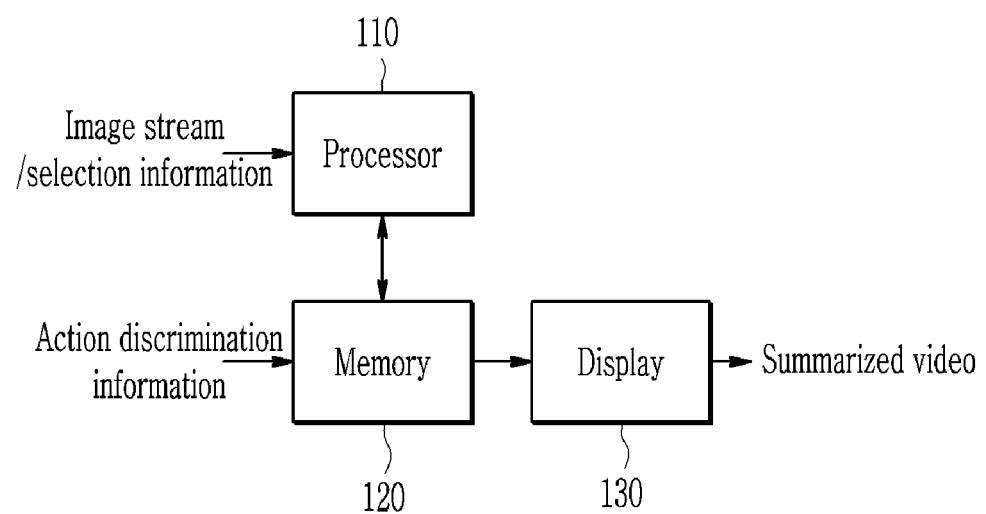
FIG. 1 is a structural diagram of an image summarization system according to an exemplary embodiment of the present invention.

An exemplary embodiment of the present invention provides a method for summarizing an input image by an image summarization system. The method includes extracting a background frame and object information of each of objects from an image stream; receiving a region of interest set in a predetermined region of the background frame; selecting extracted objects as a queue object; and generating a summarized video based on the queue object, the background frame, and the region of interest.

Another exemplary embodiment of the present invention provides a system for summarizing an input image. The system includes a memory storing an image summarization program; and a processor executing the image summarization program in link with the memory, in which the processor generates a summarized video based on a queue object for objects extracted from an image stream and a background frame extracted from the image stream, and a region of interest set in a predetermined region of the background frame.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Prior to describing the exemplary embodiment of the present invention, the term "summarized video" used in the exemplary embodiment of the present invention refers to a moving image in which objects appearing in an original image stream are exposed in an image at a time shorter than a running time of the original image stream. The summarized video may be generated such that only objects of a specific condition are exposed in the summarized video based on selection information input by a user (also referred to as a controller), or generated such that all objects are exposed in the moving image without special selection condition.

In the original image stream, the number of objects appearing in frame is not the same. However, the same number of objects may appear in every frame through the summarized video. In the image stream, the objects appear in a time order in which the objects are shot. However, the objects appearing at different time zones appear at the same time at a certain time when the user confirms the summarized video in the summarized video, and thus an execution time of the summarized video is reduced.

For example, it is assumed that three objects appear at 12:00 in the image stream. In addition, it is assumed that the selection information is input so that all the 10 objects are displayed on one screen at the same time through the summarized video. Then, an image summarization system allows not only three objects that appear in the image stream at 12:00, but also seven objects out of the objects that appear after 12:00 or before 12:00 to appear in the summarized video in advance at 12:00. Thus, the image stream may be summarized and provided to the user without skipping the frame.

Another term 'summarized image' means an image in which only objects selected based on the selection information input by the user are all inserted into one image or an image in which one or more objects taking a predefined action are all inserted into one image, and the summarized image is provided to the user.

Hereinafter, a system and a method of object queue-based image summarization according to exemplary embodiments of the present invention will be described with reference to the drawings.

FIG. 1 is a structural diagram of an image summarization system according to an exemplary embodiment of the present invention.

As illustrated in FIG. 1, the image summarization system 100 includes a processor 110, a memory 120, and a display 130.

The image summarization system 100 includes hardware including one or more processor 110, one or more memory 120, and the display 130, and stores an image summarization program executed in combination with the hardware. The image summarization program includes instructions implementing an operation method of the present invention and the processor executes the image summarization program in link with hardware such as a memory device.

The processor 110 receives an image stream of a control image collected by a control image collection device (not illustrated) such as CCTV. In addition, the processor 110 generates metadata of an object in every frame of the received image stream.

That is, the processor 110 checks all frames constituting the received image stream and detects all objects appearing in the image stream. The processor 110 assigns identification information to each newly detected object and also identifies frame identification information in which the object is detected. In this case, when the object has already been detected in a previous frame, the processor 110 does not assign object identification information to the object.

In the present invention, it is described as an example that the frame identification information confirmed by the processor 110 is automatically assigned to the frame at the time when the control image collection device collects the image stream. A method for detecting the object in the frame by the processor 110 may be performed by various methods and is not limited to one method in the exemplary embodiment of the present invention.

The processor 110 counts the number of detection times of the object, and determines how many frames the object to which the identification information is assigned is detected. The processor 110 confirms whether the number of detection times of the object is greater than a predetermined threshold value.

When the number of detection times of the object is smaller than the threshold value, the processor 110 sets an object of which the number of detection times is smaller than the threshold value as a temporary object. The temporary object is an object that is not inserted into a background frame when generating the summarized video or the summarized image. The processor 110 does not track a movement path of the temporary object or an action pattern of the temporary object.

However, when the number of detection times of the object is greater than the threshold value, the processor 110 sets an object of which the number of detection times is greater than the threshold value as a valid object. Then, the processor 110 tracks the valid object in all frames to generate object tracking information. The object tracking information includes coordinate information of the object, size information of the object, representative color information of the object, and object identification information. A method for extracting the representative color information will be described below.

The processor 110 generates object metadata for each of one or more valid objects that are tracked. In the exemplary embodiment of the present invention, the processor 110 generates the object metadata for each frame. The object metadata includes frame identification information and object tracking information of all valid objects detected in the frame.

The processor 110 extracts a plurality of object tracking information for one valid object according to the number of detection times of the frame. The plurality of object tracking information for one valid object is collected and referred to as object information of the valid object. The object information includes the object identification information, time information in which the object first appears in the image stream, a type (person or object) of object, size information of the object, object location information and action information taken by the object, object representative color information, object appearance time information, and the like.

The processor 110 may confirm the movement path of the valid object based on the coordinate information of the object included in the plurality of object tracking information. In addition, the processor 110 tracks the action of the valid object based on a plurality of size information. Here, the location information means locational coordinates in which the valid object appears in one frame. The size information means a value constituted by a horizontal length and a vertical length of the valid object.

The memory 120 stores the object metadata generated by the processor 110. The object metadata is stored and managed for each frame. In the exemplary embodiment of the present invention, it is described as an example that the memory 120 stores the object metadata in the form of a query. On the other hand, the object metadata may be stored in another storage device (not illustrated).

The memory 120 stores instructions for generating the summarized video according to the exemplary embodiment of the present invention. Further, the memory 120 stores the summarized video or the summarized image generated by the processor 110.

The memory 120 receives and stores action discrimination information inputted from the outside. This is to collect only the objects taking an abnormal action among a plurality of objects or only the objects selected by a user input, and provide the collected objects to the user as the summarized image.

The action discrimination information includes abnormal action information, priority information according to an abnormal action, and action information when the object performs an action (walking, running, passing through the gate, etc.), and the like. As a method for collecting the abnormal action information or the action information, various methods may be used and in the exemplary embodiment of the present invention, only one method is not described.

The display 130 outputs the summarized video or the summarized image stored in the memory 120 to the user.

Next, a method for summarizing the image stream by the processor 110 will be described.

The processor 110 extracts the background frame from the image stream. In addition, the processor 110 generates the summarized video, by using the metadata stored in the memory 120, in the extracted background frame.

The processor 110 extracts a plurality of background frames in order to make a background look similar to the actual time lapse (for example, from day to night, or from night to day) even in the summarized video provided to the user. The processor 110 assigns background frame identification information and time information for the background frame to a plurality of extracted background frames. Here, the processor 110 may extract the background frame in various methods from the image stream and in the exemplary embodiment of the present invention, the following method will be described as an example.

The processor 110 selects a plurality of background candidate frames as the background. The processor 110 may select a background candidate frame according to brightness of light at the time when the image stream is collected. That is, histograms of Hue Saturation Value (HSV) color domains of a previous background candidate frame and a current frame are obtained.

The processor 110 calculates a similarity measurement value for a distance measurement of two histograms using a correlation. The processor 110 extracts, as the background candidate frame, a frame indicating that the calculated similarity measurement value is equal to or less than a predetermined threshold value. As a method of calculating the histogram of the HSV color domain by the processor 110 or a method for calculating the similarity measurement value of the distance measurement of the two histograms using the correlation, various methods may be used, and as a result, the method is not limited to one method in the exemplary embodiment of the present invention.

While the processor 110 selects the plurality of background candidate frames, the processor 110 uses a first start frame as a first background candidate frame regardless of the presence or absence of the object when there is no previous background candidate frame.

When the plurality of background candidate frames is selected, the processor 110 selects a background frame with which the object is to be synthesized at the time of generating the summarized video. A method for selecting the background frame may be described by the following two methods.

A first method is a method for selecting the background frame when there is no object in the background candidate frame. When there is no object in the background candidate frame, the processor 110 selects the background candidate frame as the background frame.

A second method is a method for selecting the background frame when there is the object in the background candidate frame. If there is the object in the background candidate frame, the processor 110 confirms object region overlapping between the background candidate frame and next frames based on next frames adjacent to the background candidate frame. In this case, the processor 110 can refer to the object metadata stored in the memory 120. This will be first described with reference to FIG. 2.

Figure 2:
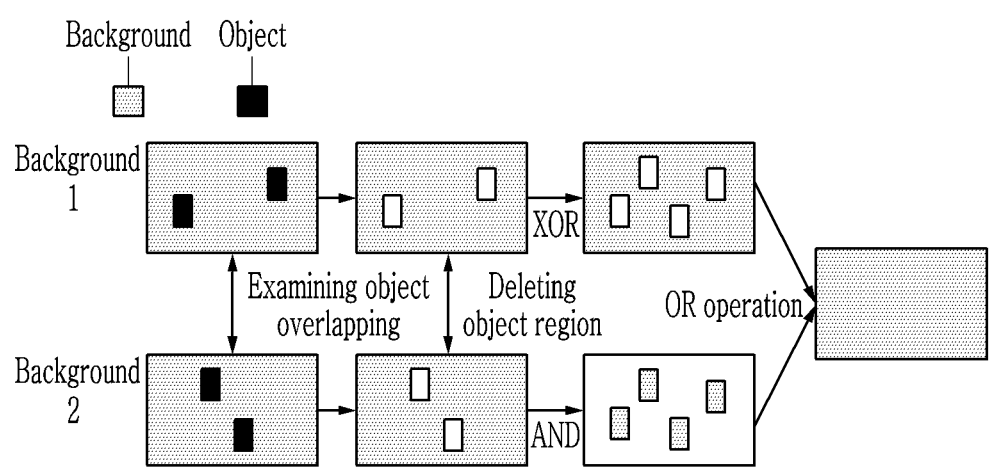
FIG. 2 is an exemplary diagram illustrating a method for generating a background frame according to an exemplary embodiment of the present invention.

FIG. 2 is an exemplary diagram illustrating a method for generating a background frame according to an exemplary embodiment of the present invention.

As illustrated in FIG. 2, it is assumed that a frame indicated by background 1 is the background candidate frame and a frame indicated by background 2 is the next frame adjacent to the background candidate frame. Then, the processor 110 compares the two frames (background 1 and background 2) to check whether object regions overlap with each other.

As a result of checking whether the regions overlap, the processor 110 may confirm that two object regions shown in background 1 and two object regions shown in background 2 are displayed in a region not overlapping each other. In this case, the processor 110 deletes the object region in each of the two frames. Then, the processor 110 performs a logic operation on the two frames to generate and extract a background frame without the object.

Since the plurality of background frames is sparsely extracted from one image stream, the lag may occur in the summarized video when the previous background frame of the summarized video switch to the next background frame. Thus, the processor 110 calculates the number of frames existing between the two background frames, based on a frame identification number for the previous background frame and a frame identification number for the next background frame, for natural switching between the two background frames. Then, the processor 110 performs alpha blending on the images of the two background frames based on the calculated number of frames.

For example, the processor 110 may calculate the total length of the summarized video based on the number of object layers to be inserted into the summarized video and the number of frames of an entire image stream when the processor 110 performs alpha blending. Then, the processor 110 may obtain a placement index in which each background frame is placed in the summarized video, based on the total length of the summarized video and the number of background frames. Here, a method in which the processor 110 calculates the total length of the summarized video or a method for obtaining the placement index in which the background frame is to be placed may be performed in various methods and is not limited to one method in the exemplary embodiment of the present invention.

When it is assumed that the corresponding summarized video is a summarized video in which five background frames are extracted, the length of the summarized video is 20 minutes, and the length of the summarized video is 40 frames per minute, the processor 110 may obtain a location of the summarized video into which five background frames are to be inserted. The processor 110 provides the background that appears when the summarized video is played through alpha blending of the two background frames.

For example, it is assumed that the processor 110 divides a section of the summarized video into four following intervals: 0 to 5 minutes for a first interval, 5 to 10 minutes for a second interval, 10 to 15 minutes for a third interval, and 15 to 20 minutes for a fourth interval. The processor 110 provides the background that appears when the summarized video for the first interval is played through alpha blending of a first background frame and a second background frame.

That is, the number of frames in the first interval is 200 (5 minutes*40 frames) and the processor 110 uses the first and second background frames by the alpha blending during the first interval. Similarly, the processor 110 alpha-blends and provides the second background frame and a third background frame during the second interval, the third background frame and a fourth background frame during the third interval, and the fourth background frame and a fifth background frame during the fourth interval.

If only one interval is described, when the processor 110 alpha-blends the first background frame and the second background frame between 0 to 5 minutes as the first interval, the processor 110 alpha-blends two background frames by setting an alpha value (hereinafter, referred to as a 'first alpha value') for the first background frame to 100% and an alpha value (hereinafter, referred to as a 'second alpha value') for the second background frame to 0% in a first frame. Here, the alpha value means transparency of each background frame when alpha-blending two background frames.

In addition, in frame #200 which is a last frame of the first interval, the processor 110 alpha-blends two background frames by setting a first alpha value to 0% and a second alpha value to 100%. In this case, the processor 110 increases or decreases and alpha-blends alpha values from frames #0 to #200 for frame.

That is, every time the frame increments one by one, the processor 110 sets the alpha value by decreasing the first alpha value by 0.5% and increasing the second alpha value by 0.5%. According to such a rule, the first alpha value in the second frame is 99.5%, and the second alpha value is 0.5%. In the present invention, it is described as an example that the processor 110 sets the alpha value, alpha-blends two background frames, and provides the alpha-blended background frames as the background frame by the above-described method, but the present invention is not limited thereto.

Through the alpha blending of the frame, the processor 110 prevents a phenomenon in which the background frame of the summarized video suddenly changes from day to night or from night to day, and the background may be switched naturally and provided as the summarized video.

When the background frame is extracted as described above, the processor 110 synthesizes the object information generated based on the object metadata stored in the memory 120 with the background frame to generate the summarized video. The processor 110 may generate the summarized video in various methods through the selection information, which will be described later.

At the time of generating the summarized video based on the background frame and the object information, when the selection information is input by the user, the processor 110 generates the summarized video in various methods using the input selection information. Here, the selection information includes one information of region of interest (ROI) information in which an region is designated, the maximum number of objects to be exposed on one screen in the summarized video, selected object information to be checked, and object search information to be searched.

If the selection information includes the maximum number of objects, the processor 110 generates as many object layers as the maximum number of objects so that as many objects as the maximum number of objects may be simultaneously exposed to the summarized video. In this case, when the maximum number of objects is not included in the selection information, the processor 110 may generate a predetermined number of object layers or generate object layers of a number as large as the number of extracted objects.

The processor 110 inserts the extracted objects into the queue, and then assigns the extracted objects to the object layer in the queue one by one. Here, the object inserted into the queue by the processor 110 is referred to as a 'queue object'. The objects to be inserted into the queue are either the object selected by the user, the object to be searched by the user or the object extracted by the selection information.

In the exemplary embodiment of the present invention, it is described as an example that the queue object is inserted into the object layer and then synthesized with the background frame. However, the processor 110 may synthesize the queue object inserted into the queue with the background frame immediately.

In this case, the processor 110 sets the queue selection information as many as the maximum number of objects, and synthesizes the queue objects stored in queue selection information with the background frame. For example, assuming that the maximum number of objects is five, the processor 110 sets the queue selection information to 5 and synthesizes the queue objects inserted into the five queues with the background frame.

In placing the queue objects to be played in the summarized video in the background frame, the processor 110 assigns the queue objects to the object layer so that the objects do not overlap in the same space.

Alternatively, in placing the queue objects in the background frame, the processor 110 may assign the queue object to the object layer even if the objects overlap on the same space.

When the objects overlap on the same space, the processor 110 may provide the user with the summarized video by using a first method for generating the summarized video or the summarized image based on the ROI input by the user so that the objects do not overlap. Alternatively, the processor 110 may provide the user with the summarized video by using a second method for generating the summarized video or the summarized image so that the objects do not overlap by determining the overlap between the objects in advance.

In the first method, when the user selects an overlapped portion of the objects as the ROI in a process of confirming the summarized video, the processor 110 unfolds and arranges a plurality of overlapping objects in the ROI. Then, the processor 110 provides the arranged objects as a separate summarized image or summarized video. Here, when arranging the objects, the processor 110 arranges the objects in an appearance time order in which the objects appear first in the image stream. In the exemplary embodiment of the present invention, it is described as an example that the processor 110 arranges the overlapped objects in the order of an appearance time, but the present invention is not particularly limited thereto.

In the second method, when the ROI is not selected, the processor 110 checks whether at least two objects moving at any location are overlapped based on movement path information of the object. In addition, when it is predicted that the plurality of objects overlaps at any location, the processor 110 may adjust the size of a surrounding region based on the location where the overlapping occurs, so that the objects may be configured not to overlap. Alternatively, the processor 110 may rearrange a plurality of objects passing through a location where the overlapping occurs to prevent the overlapping of the objects. This will be described in detail later.

When the received selection information includes object search information for searching the object, the processor 110 generates only the objects corresponding to the object search information as the summarized video.

In addition, the processor 110 compares the objects and the action discrimination information stored in the memory 120. When there are the objects taking the abnormal action, the processor 110 generates the objects that take the abnormal action as the summarized image. When the number of objects taking the abnormal action is large or the number of searched objects is large, the processor 110 may generate a plurality of summarized images.

In addition, when the processor 110 receives the object selection information for any object among the objects provided in the summarized image, the processor 110 separately generates the summarized video based on the object selection information.

The processor 110 distinguishes an upper region and a lower region based on the object size information in order to extract the object representative color for each valid object. In the exemplary embodiment of the present invention, a reference point for distinguishing the upper region and the lower region from the size information is not limited to specific form.

Then, a value having a largest ratio among RGB values in the upper region and the lower region is extracted as a representative value, and the color is set to an upper color and a lower color. A method in which the processor 110 extracts the representative value by comparing the color represented in the upper region and the lower region with the RGB value may be performed by various methods and is not limited to one method in the exemplary embodiment of the present invention. In addition, in the exemplary embodiment of the present invention, the representative color of the objects is described with two colors of the upper color and the lower color as an example, but is not particularly limited thereto.

The object representative color is stored in the memory 120 as the object metadata together with the object identification information, region information, and the like. In the exemplary embodiment of the present invention, it is described as an example that the object representative color is extracted and provided, but various information may be stored as metadata such as facial feature information, vehicle feature information, etc. Although it is described as an example that the processor 110 extracts the object representative color at the time when the object representative color is extracted as the valid object in the image stream, the present invention is not particularly limited thereto.

In addition, when one or more object is located in the ROI or the objects pass through the ROI, the processor 110 arranges the objects in an order in which the objects enters the ROI, and provides the arranged objects as a separate summarized image. Here, the ROI is a region designated in advance by the user or set by the user at the time of playing of the summarized video. Only one ROI may be set or a plurality of ROIs may be set.

Assuming that one ROI is set, the processor 110 arranges one or more objects already located within the ROI in the order of entry into the ROI and provides the arranged objects as the summarized image. The objects located in the ROI may be located in an overlapping state within the ROI or may be located in a non-overlapping state. The processor 110 may check the order in which the objects enter the ROI based on the object information and the checking method may be performed by various methods, so that a detailed description thereof will be omitted in the exemplary embodiment of the present invention.

In addition, when one ROI is set, the processor 110 arranges one or more objects passing through the ROI, and provides the arranged objects as the summarized image. Here, the objects passing through the ROI may pass over in the overlapping state in the ROI or may pass over in the non-overlapping state. In addition, the processor 110 extracts the objects passing through the ROI based on movement line information of the objects, and provides the extracted objects as the summarized image, and arranges and provides the objects in the order in which the objects enter the ROI.

On the other hand, when the plurality of ROIs is set, the processor 100 analyzes movement lines of the objects passing through all of the plurality of ROIs and arranges and provides the objects as the summarized image in the order in which the objects passes through all of the ROIs. In this case, the objects may be exposed in the summarized video in the overlapping state in one ROI among the plurality of ROIs or may be exposed in the summarized video in the non-overlapping state. In addition, in the exemplary embodiment of the present invention, it is described as an example that the processor 110 arranges the objects in the order in which the objects pass through all of the ROIs as the summarized image, but the present invention is not particularly limited thereto.

When the received selection information includes ROI information for an region, the processor 110 differentiates playing speeds of the object in the ROI and outside the ROI. For example, when the object enters the ROI, the playing speed of the object in the ROI is controlled so as to be played faster or slower than the object playing speed outside the ROI.

Here, the ROI refers to one of regions in which a plurality of objects are played in the overlapping state at the same location or the user is interested. Another ROI as a range which is smaller than the ROI may be overlapped and selected within one ROI or only a partial region may be overlapped and selected.

A method for generating the metadata using the image summarization system 100 described above will be described with reference to FIG. 3.

Figure 3:
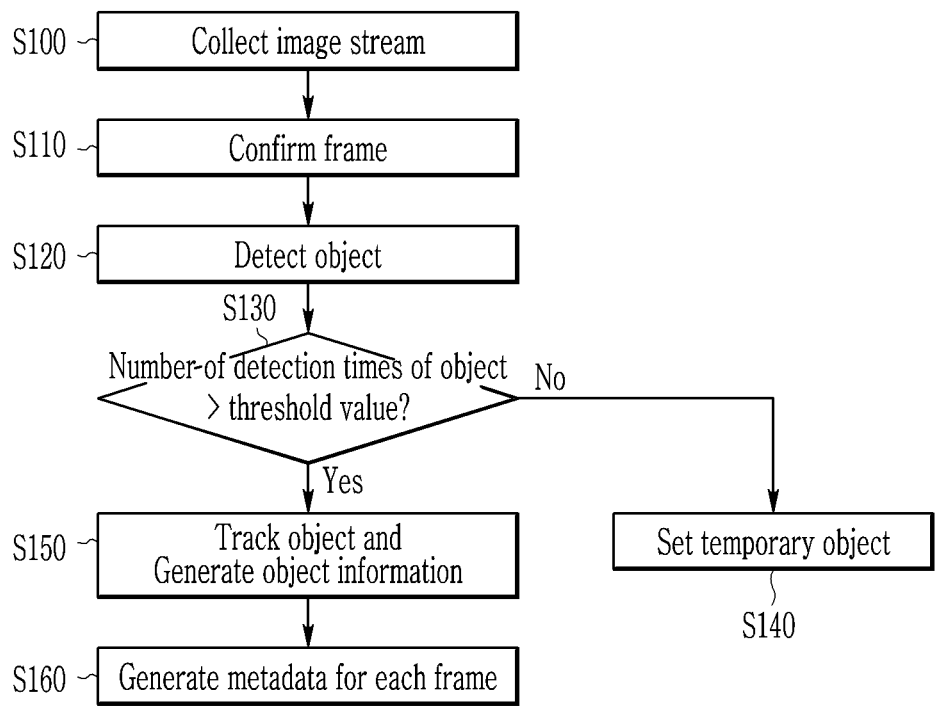
FIG. 3 is a flowchart illustrating a method of generating metadata according to an exemplary embodiment of the present invention.

FIG. 3 is a flowchart illustrating a method of generating metadata according to an exemplary embodiment of the present invention.

As illustrated in FIG. 3, the processor 110 receives an image stream which is a control image collected by the control image colleting device (S100). The processor 110 checks all plural frames constituting the image stream received in step S100 from a first frame, which is a start frame (S110).

If an object is included in the checked frame, the processor 110 detects all of one or more objects included in the frame (S120). The processor 110 assigns identification information to each of the one or more objects detected in step S120. In addition, the processor 110 also checks frame identification information for the currently checked frame.

The processor 110 counts the number of detection times of the object to which the identification information is assigned, and checks whether the number of detection times at which the object is detected in the image stream is greater than a predetermined threshold value (S130). Here, object identification information is described with object identification information which the processor 110 assigns at the time when the object first appears in the image stream as an example, but is not particularly limited thereto.

If the number of detection times of the object is less than the predetermined threshold value, the processor 110 sets the detected object and the identification information for the object as a temporary object (S140).

However, if the number of detection times of the object is greater than the threshold value, the processor 110 sets the object as a valid object. In order to determine a movement path of the object or an action of the object, the processor 110 checks and tracks the object set as the valid object from the first detected frame (S150).

The processor 110 also generates object tracking information for each valid object while tracking the object in step S150. The object tracking information includes coordinate information of the object in a current frame, size information of the object, object representative color information, and object identification information. In this case, the processor 110 extracts an object representative color for the object while tracking the object in step S150.

The processor 110 generates object metadata based on the object tracking information generated in step S150 (S170). Here, when the object first appears in the frame in which the object tracking information is generated, the processor 150 may set the time information for the current frame as object appearance time information and store the time information together with the object metadata.

In addition, the processor 110 delivers the generated object metadata to the memory 120 and stores the generated object metadata in the memory 120. Here, the object metadata is stored in the memory 120 for each frame and the object metadata includes frame identification information and object tracking information of all objects detected in the frame.

An example of the method in which the processor 110 generates the metadata is described below. It is assumed that the processor 110 receives a 12-hour image stream and the image stream is taken at 30 frames per second.

Then, the processor 110 examines the first frame which is the start frame and extracts all of the objects. Here, when there is an object in the first image stream among the extracted objects, the processor 110 generates the identification information for the object. Then, it is checked whether the extracted objects are also detected in a frame which subsequently appears and it is checked whether the number of detection times of the checked object is greater than a predetermined threshold value.

If the number of detection times is less than the threshold value, the processor 110 recognizes the object as an object that does not affect the control, such as insects or dust, and sets the corresponding object as a temporary object. However, If the number of detection times of the object is greater than the threshold value, the object may be highly likely to be an object requiring the control.

Accordingly, the processor 110 sets the object of which the number of detection time is greater than the threshold value as the valid object. Then, the object is tracked to identify the movement path of the valid object or the action taken by the valid object by checking subsequent frames starting from the frame in which the object appears first. The processor 110 generates the object tracking information on the tracked valid object and stores and manages the object tracking information together with the frame identification information as the object metadata.

Figure 4:
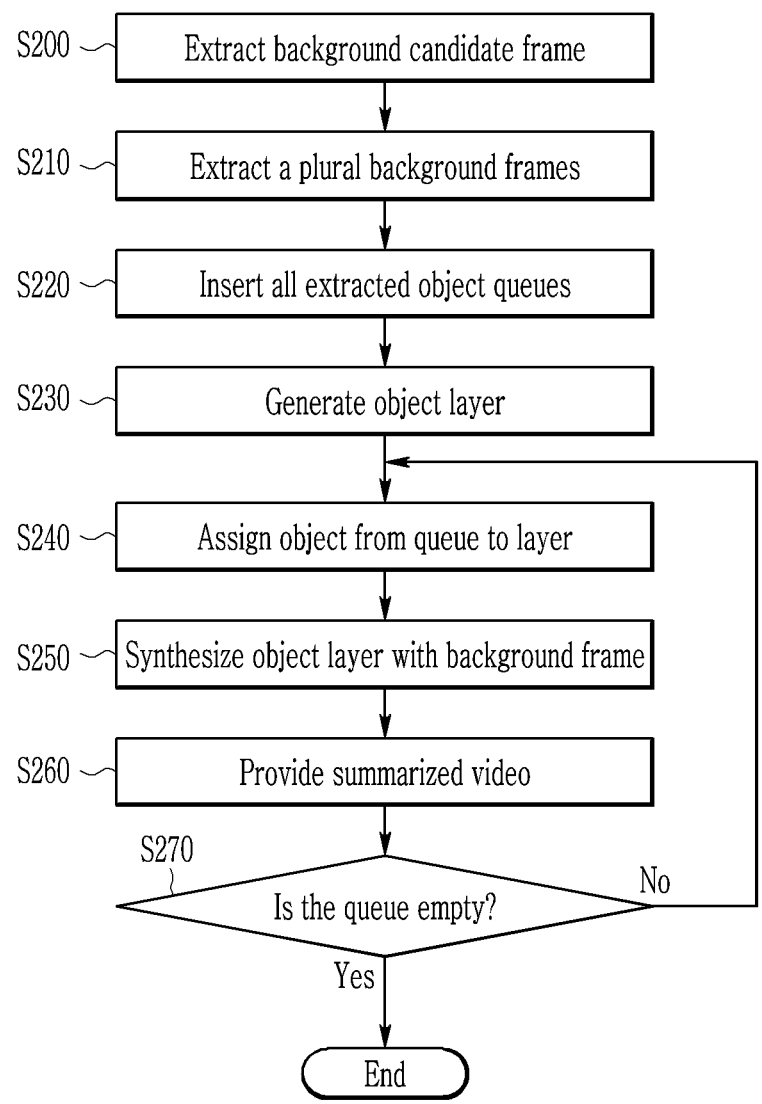
FIG. 4 is a flowchart illustrating a method for providing a summarized video according to an exemplary embodiment of the present invention.

Referring to FIG. 4, a method in which the processor 110 provides the summarized video by using the object metadata after generating the object metadata by the method described above will be described.

FIG. 4 is a flowchart illustrating a method for providing a summarized video according to an exemplary embodiment of the present invention.

As illustrated in FIG. 4, the processor 110 first extracts a plurality of background candidate frames from the plurality of frames constituting the image stream (S200). When the plurality of background candidate frames is selected, the processor 110 extracts a plurality of background frames with which the object is to be synthesized at the time of generating the summarized video (S210).

This is to make a background the summarized video provided to the user look similar to the actual time lapse (for example, from day to night, or from night to day) and the processor 110 may extract a plurality of background frames. In addition, the plurality of extracted background frames includes background frame identification information and time information on the background frame.

First, when there is no object in the background candidate frame, the processor 110 extracts the background candidate frame as the background frame. However, when there is the object in the background candidate frame, the processor 110 confirms overlapping of an object region by using a next frame adjacent to the background candidate frame by referring to the object metadata stored in the memory 120.

Then, when the object regions which respectively appear in two frames do not overlap, the processor 110 deletes the object region in each of the two frames. Then, the processor 110 performs a logic operation on the two frames to generate and extract a background frame without the object.

When the background frame is extracted in step S200, the processor 110 inserts the object extracted from the image stream into a queue based on the object metadata stored in the memory 120 (S220). The object inserted into the queue is referred to as a "queue object". The processor 110 generates object layers as many as one of a predetermined number, the number of extracted objects, or the maximum number of objects by selection information input by the user (S230).

In the exemplary embodiment of the present invention, it is described as an example that the processor 110 generates the object layer, but against a case of directly inserting the queue object into the background frame in the queue, the processor 110 may set queue selection information for one number.

The processor 110 may generate the object layer or set the queue selection information in various methods and the method is not limited to one method in the exemplary embodiment of the present invention.

In the exemplary embodiment of the present invention, for convenience of description, it is described as an example that the processor 110 generates object layers as many as the maximum number of objects included in the selection information. When the object layer is generated in step S230, the processor 110 assigns object information of the queue object inserted into the queue to the object layer (S240).

Since the object information is assigned to the object layer, the user may determine a direction in which the object moves, when the object appears in the image stream, what shape/size the object has, what the object identification information is, and what a representative color of the object is through the summarized video.

The processor 110 synthesizes the object layer to which the object information is assigned in step S240 with the background frame extracted in step S210 (S250). When the processor 110 synthesizes the object layer with the background frame, the object layer is synthesized with the background frame based on the object appearance time information in which the object first appears and the time information of the background frame. That is, If the object appears in the morning, the processor 110 synthesizes the object layer with the background frame for a morning time zone.

In addition, when the processor 110 synthesizes the object layer with the background frame, only a portion that is different from the background frame location is expanded, closed, and filtered to be naturally synthesized with the background frame. In this case, the portion is a location where the object appears is set as a mask region and the mask region. Further, when the processor 110 synthesizes the object layer with the background frame, the objects may be synthesized so as not to overlap in the same space or the object layers may be synthesized in an order in which the objects are inserted in the queue even if the objects overlap on the same space.

When a plurality of object layers are synthesized with the background frame, the processor 110 provides a moving image in which the object layer and the background frame are synthesized to the user as the summarized video (S260). In addition, when the object corresponding to the object information assigned to one of the object layers is executed through the summarized video and the object layer is in an empty, the processor 110 determines whether the queue is an empty (S270).

When the object is still inserted into the queue, the processor 110 continues to perform step S240 of assigning the queue object which remains in the queue to the empty object layer. However, when the queue is an empty, the provision of the summarized video ends.

An example of synthesizing the object layer with the background frame in the process of providing the summarized video described above will be described with reference to FIG. 5.

Figure 5:
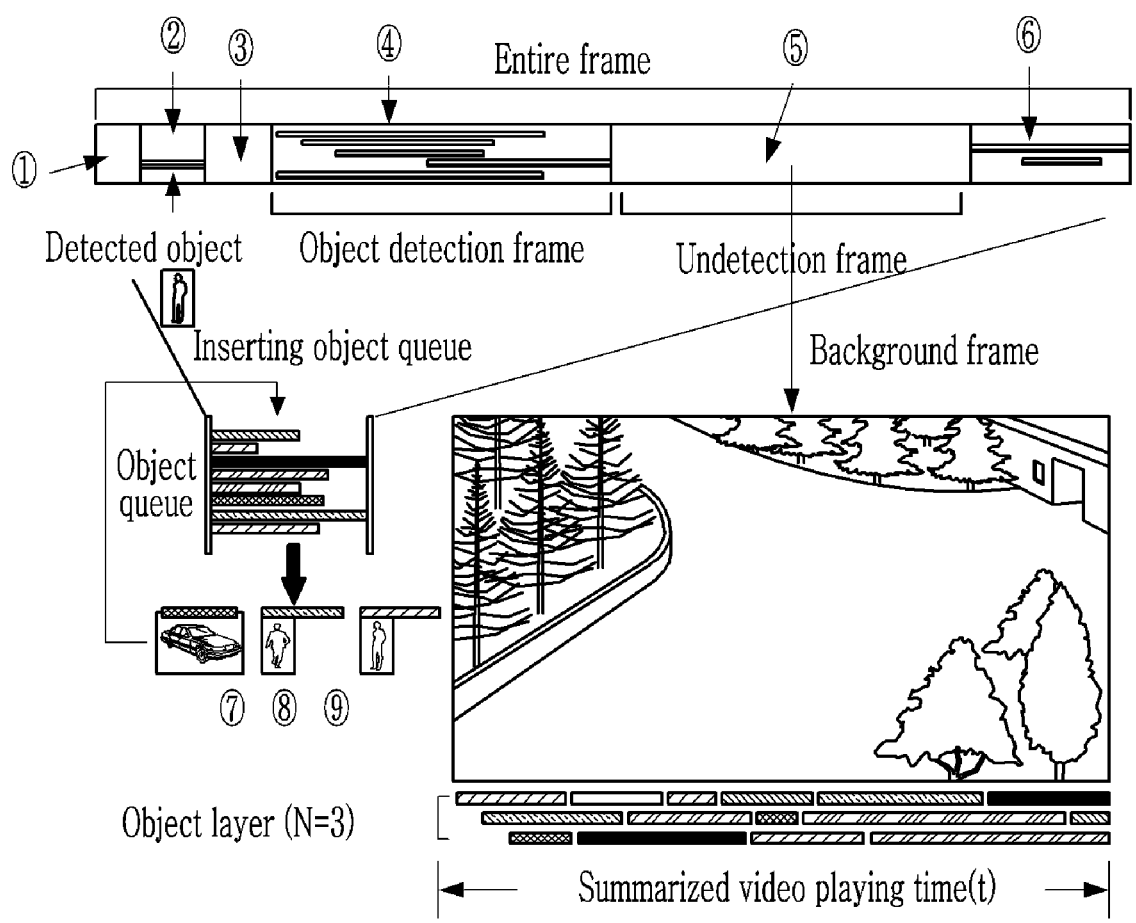
FIG. 5 is an exemplary diagram illustrating an object synthesis concept according to an exemplary embodiment of the present invention.

FIG. 5 is an exemplary diagram illustrating an object synthesis concept according to an exemplary embodiment of the present invention.

As illustrated in FIG. 5, all frames of the image steam may be divided into regions (2, 4, and 6) where the object is detected and non-detection regions. In this case, three frames out of the undetected regions (1, 3, and 5) where the object is not detected are used as the background frames.

Here, an object detected in the second region (2) is synthesized with frame extracted as the background frame of the first region (1) and objects detected in the fourth region (4) are synthesized with frame extracted as the background frame in the third region (3). In addition, it is described as an example that objects detected in the sixth region (6) are synthesized with frame extracted as the background frame in the fifth region (5).

Then, the processor 110 inserts all objects detected in the entire frame into the queue. When the object layer is generated, the processor 110 inserts the object information for the queue objects inserted into the queue into the object layer and synthesizes the object layer with the background frame.

FIG. 5 illustrates that three object layers are generated as an example. In a first layer, a car which is a first object (7) is inserted and in a second layer and a third layer, persons which are a second object (8) and a third object (9) are inserted.

Here, when the processor 110 synthesizes the object layer with the background, the processor 110 may synthesize the object layer with the background in the order of the size of each object or synthesize the object layer with the background in the order of the extracted objects. When it is described as an example that the object layer is synchronized in the size order, since the size of the car which is the first object is shown to be the largest, the object layer into which the first object is inserted is first synchronized with the background. In addition, the object layer is synchronized with the background in the order of the second object and the second object.

In this case, when the objects overlap each other, it is also possible to synthesize only one object layer with the background without synthesizing the object layer with the background at the same time. In this case, the processor 110 determines a time interval in the object layer so that the queue objects do not overlap in the summarized video.

Alternatively, the processor 110 may synthesize all three objects with the background frame, but in this case, the objects may be overlapped and synthesized in the same region.

An example of playing the generated summarized video described above will be described with reference to FIGS. 6 to 10.

Figure 6:
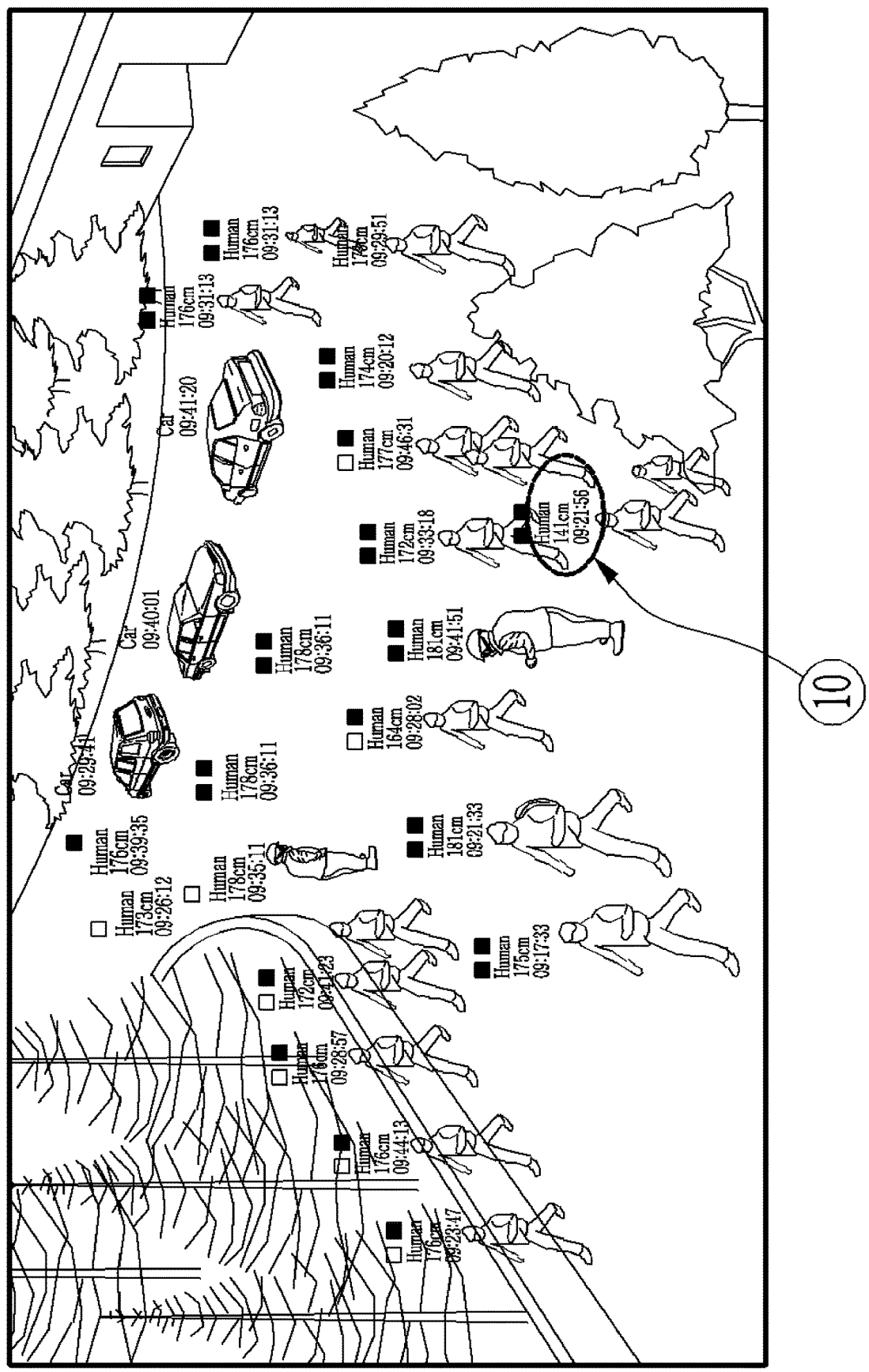
FIG. 6 is an exemplary diagram illustrating an object layer summarized video according to an exemplary embodiment of the present invention.

First, when the processor 110 synthesizes the objects so as not to overlap with each other, the objects may not be overlapped with each other in the same space, but executed as the summarized video as illustrated in FIG. 6.

FIG. 6 is an exemplary diagram illustrating an object layer summarized video according to an exemplary embodiment of the present invention.

As illustrated in FIG. 6, the processor 110 also displays the identification information of the object, information on the time when the object appears, and information (10) on the size of the object or a type (e.g., person, car, etc.) of object together. Based on the display information, the user may easily determine what kind of object the object is, which time period the object appears, and the size of the object.

Figure 7:
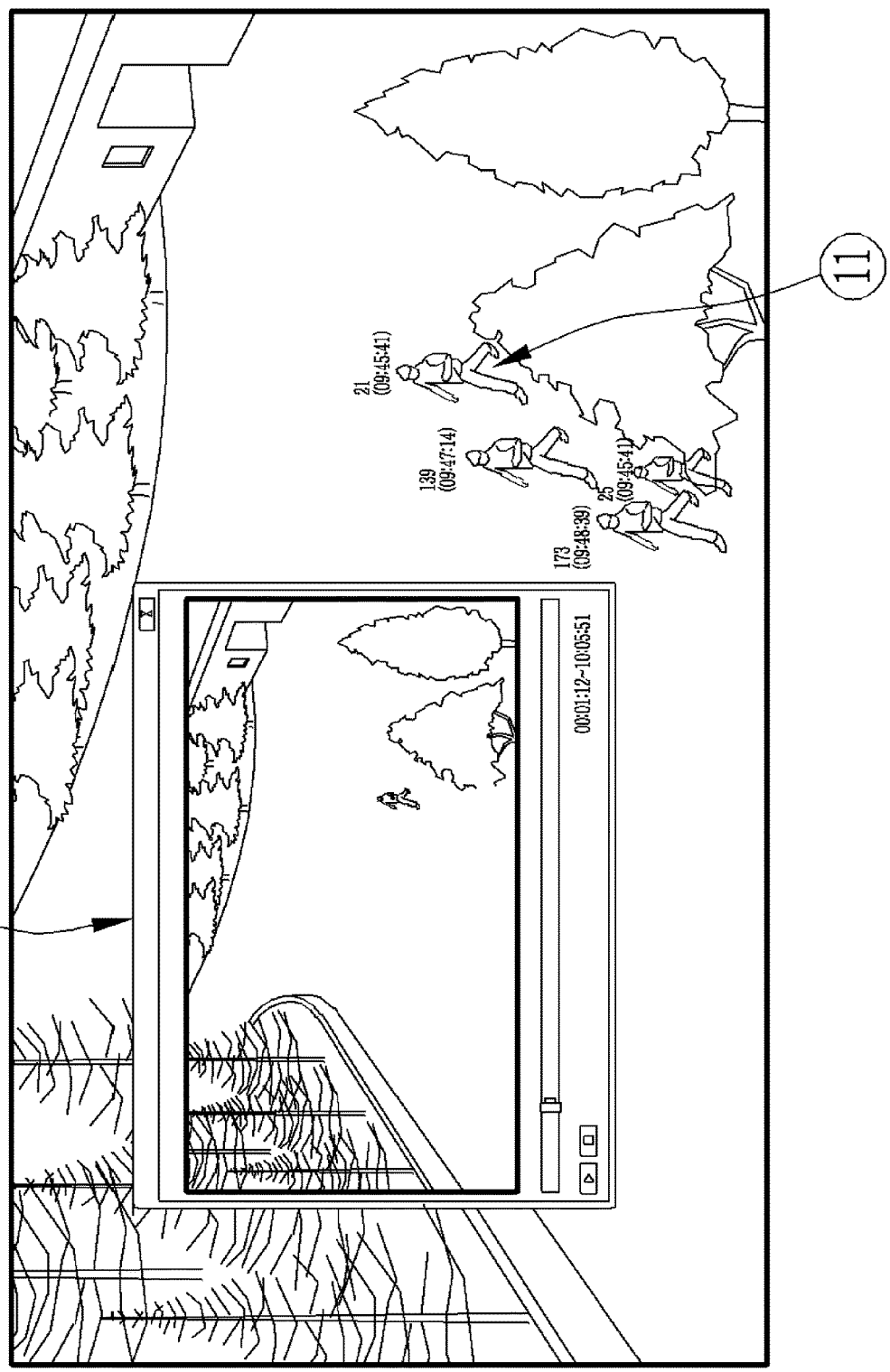
FIG. 7 is an exemplary diagram illustrating object search and playing according to an exemplary embodiment of the present invention.

FIG. 7 is an exemplary diagram illustrating object search and playing according to an exemplary embodiment of the present invention.

As illustrated in FIG. 7, when the user selects an object (11) having object identification information of 25 in the summarized video provided in FIG. 6, the processor 110 displays the movement path for the object as a new window (12). In the new window, other objects are not displayed but only the objects are displayed.

Figure 8A:
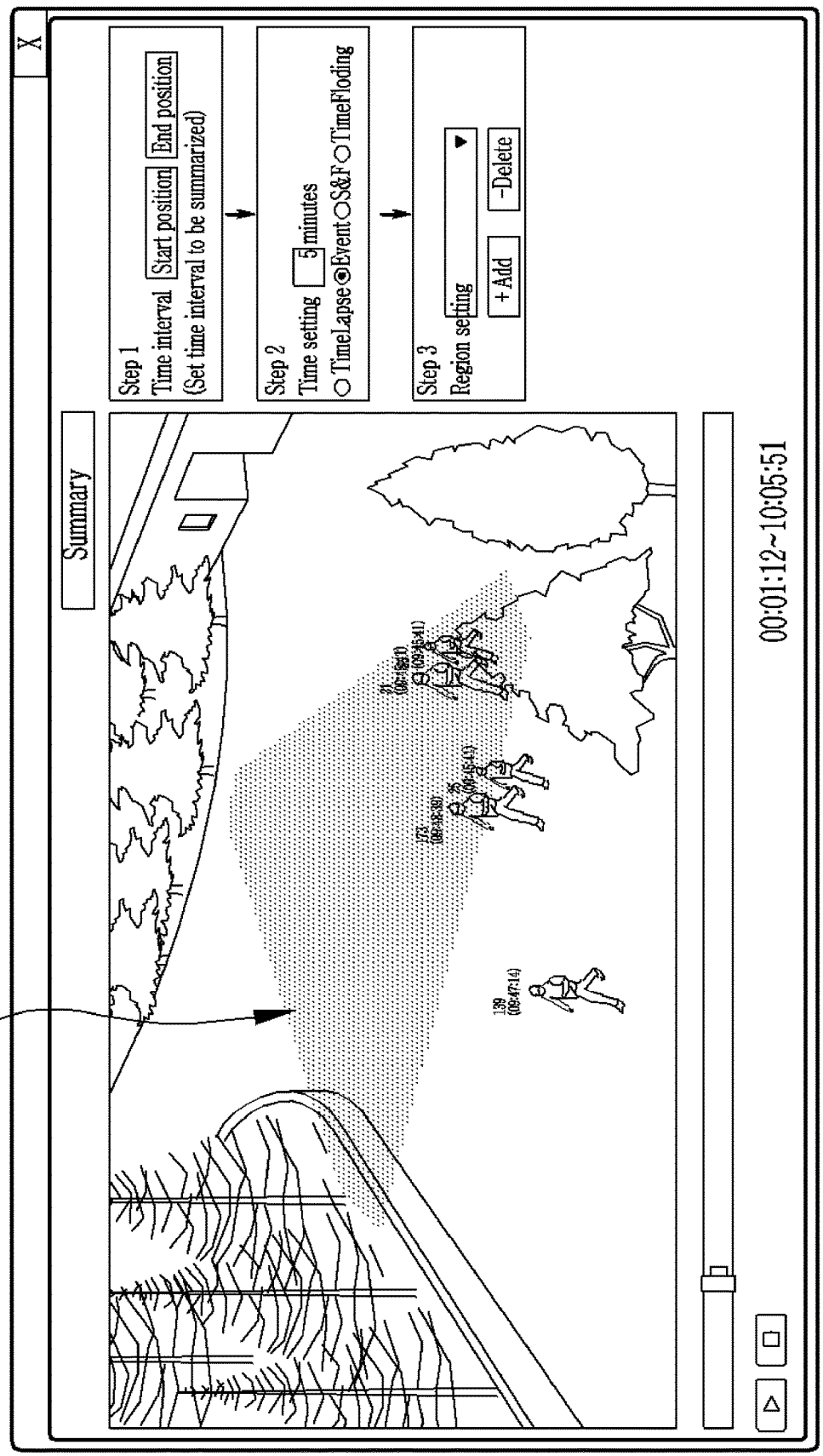
FIGS. 8A and 8B are exemplary diagrams illustrating area setting according to an exemplary embodiment of the present invention.
Figure 8B:
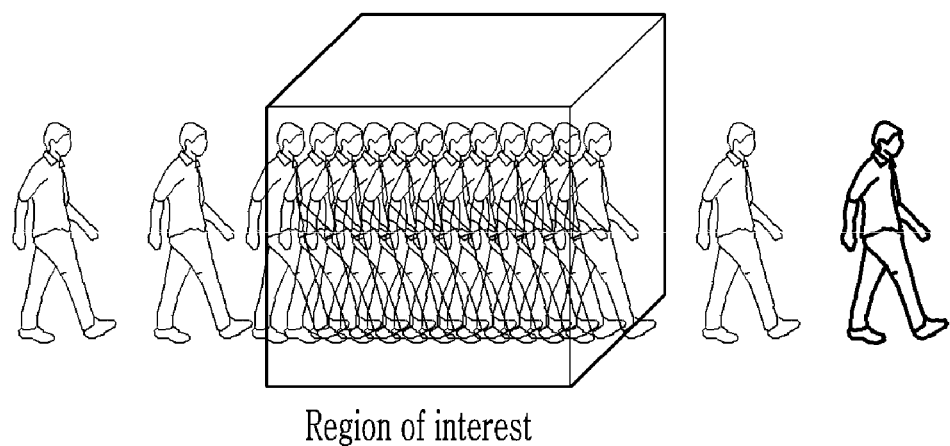

FIGS. 8A and 8B are exemplary diagrams illustrating area setting according to an exemplary embodiment of the present invention.

As illustrated in FIG. 8A, the user may set an ROI (13) in the background frame. Here, the ROI may be set in advance before the summarized video is played or may be set while the summarized video is being played. The processor 110 may control an object movement in a specific region and an object movement speed in a region other than the specific region differently.

For example, as illustrated in FIG. 8B, when an object enters the ROI, the processor 110 processes a motion of the object so as to be displayed slowly. In addition, when the object is out of the ROI, the processor 110 reproduces the object at a speed before the object enters the ROI or at a speed that is higher than the speed of an actual motion.

Since a method for adjusting the playing speeds of the objects entering the ROI and the objects not entering the ROI may be performed by various methods, the method is not limited to one method in the exemplary embodiment of the present invention. In addition, in the exemplary embodiment of the present invention, it is described as an example that the objects are played slowly in the ROI and the objects in the region other than the ROI are played quickly, but the present invention is not particularly limited thereto.

In addition, in FIG. 8A, only one ROI (13) is displayed, but another ROI may be overlapped within the ROI, and a plurality of ROIs that are not overlapped may be set.

Assuming that the ROIs are overlapped and two ROIs (first ROI and second ROI) are set, a first ROI is set to a larger range than a second ROI. In addition, the second ROI may be overlapped within the first ROI and may be set to a narrower range than the first ROI. Alternatively, a second region of interest may be set such that a partial region overlaps with the first ROI and is similar to or different from the range of the first ROI. The overlapped ROI may be set in various forms, and therefore, the present invention is not limited to one method in the exemplary embodiment of the present invention.

When the second ROI is formed to be overlapped within the first ROI and the object enters the first ROI, the processor 110 adjusts the playing speed of the object slowly or quickly. In addition, when the object enters the second ROI from the first ROI, the processor 110 controls the object to be played at a playing speed lower or higher than the playing speed at the object is played in the first ROI.

As illustrated in FIG. 8A, in the exemplary embodiment of the present invention, the user may set a time interval for generating the summarized video. That is, the user may input a start location (or a start time) and an end location (or end time) of a video stream to be checked and input summarized video generation time information as to for how many minutes the summarized video is to be generated with respect to the start location to the end location. Then, the processor 110 generates the summarized video based on the received selection information.

In this case, the previously generated summarized video may be generated longer than a time input by the user. Accordingly, the processor 110 may generate the summarized video by skipping the frame by a predetermined value in order to generate the summarized video according to the summarized video generation time information.

In addition, when one or more object is located in the ROI designated in advance by the user as illustrated in FIG. 8A or set by the user at the time of playing the summarized video or the objects pass over the ROI, the processor 110 arranges the objects in the order in which the objects enter the ROI and provides the arranged objects as a separate summarized image.

That is, assuming that one ROI is set, the processor 110 arranges one or more objects already located within the ROI in the order of entry into the ROI, and provides the arranged objects as the summarized image. The objects located in the ROI may be located in an overlapping state within the ROI or may be located in a non-overlapping state. The processor 110 may check the order in which the objects enter the ROI based on the object information and the checking method may be performed by various methods, so that a detailed description thereof will be omitted in the exemplary embodiment of the present invention.

In addition, when one ROI is set, the processor 110 arranges one or more objects passing through the ROI, and provides the arranged objects as the summarized image. Here, the objects may be overlapped or not overlapped within the ROI. In addition, the processor 110 extracts the objects passing through the ROI based on movement path information of the objects, and provides the extracted objects as the summarized image, and arranges and provides the objects in the order in which the objects enters the ROI.

On the other hand, when the plurality of ROIs is set, the processor 100 arranges and provides the objects as the summarized image in the order in which the objects passes through all of the ROIs based on the movement path information of the objects passing through all of the plurality of ROIs. In this case, the objects may be exposed in the summarized video in the overlapping state in one ROI among the plurality of ROIs or may be exposed in the summarized video in the non-overlapping state.

On the other hand, a case where the processor 110 synthesizes the object layer with the background frame without considering the overlapping of the objects will be described with reference to FIG. 9.

FIG. 9 is an exemplary diagram illustrating a method for processing overlapped objects according to an exemplary embodiment of the present invention.

As illustrated in FIG. 9, when the plurality of objects overlaps or when the user desires to extract objects passing through a specific region, the processor 110 receives an ROI (14) input from the user. Here, the ROI may be preset in advance or may be set through the summarized video that is played by the user.

The processor 110 spreads and provides the plurality of objects passing through the ROI in a separate window for the user to easily recognize. The plurality of objects passing through the ROI is objects of interest. That is, when the user selects an ROI in which the plurality of objects is overlapped and synthesized, the processor 110 confirms object identification information on a plurality of objects of interest existing in the ROI In addition, the processor 110 arranges the objects of interest in the order of the time appearing in the image stream on the basis of the confirmed identification information, and provides the objects in a separate image window. In this case, as illustrated in FIG. 9, in the exemplary embodiment of the present invention, the objects of interest are provided as separate summarized images. When the user selects object from the provided summarized images, the user may provide the summarized video for the selected object.

When a plurality of ROIs is set, the processor 110 may extract and provide objects of interest which pass over the plurality of ROIs, respectively. Alternatively, the processor 110 may extract and provide only the objects passing over all of the plurality of ROIs among the plurality of objects, as the object of interest, and the present invention is not limited to one method.

In addition, when the plurality of objects is overlapped at a point while the summarized video is being played, a method of providing the objects not to be overlapped will be described with reference to FIG. 10.

Figure 10:
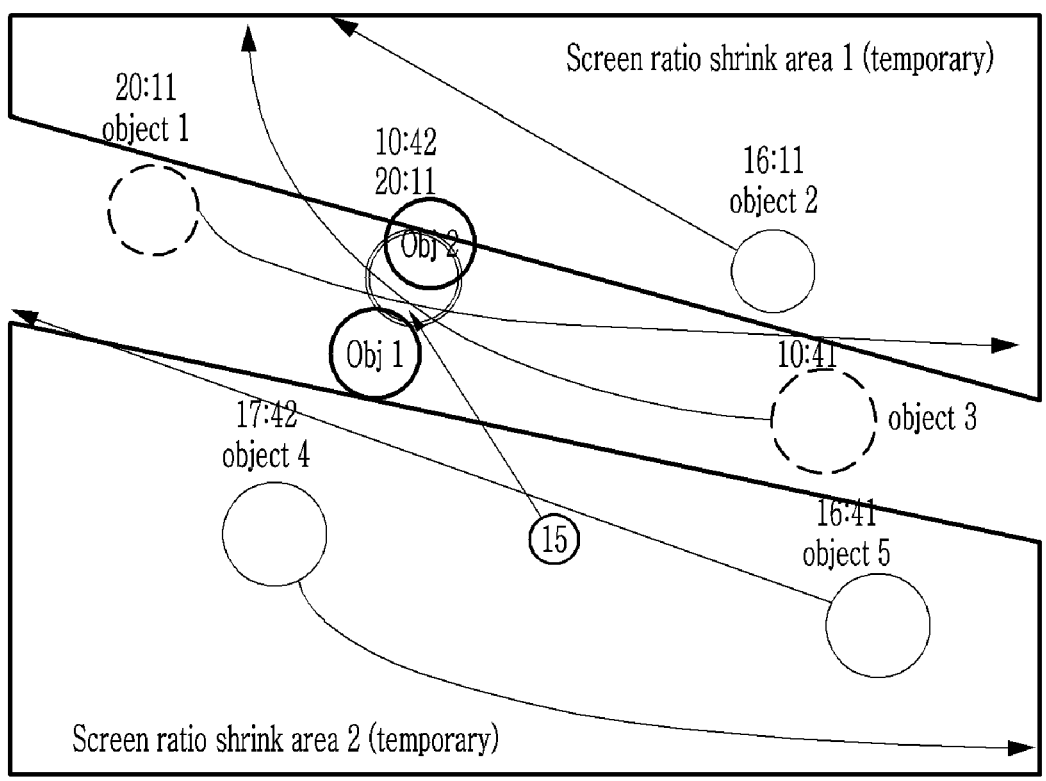
FIG. 10 is an exemplary diagram illustrating a method for playing overlapped objects according to an exemplary embodiment of the present invention.

FIG. 10 is an exemplary diagram illustrating a method for playing overlapped objects according to an exemplary embodiment of the present invention.

As illustrated in FIG. 10, it is assumed that when a first object (obj1) and a second object (obj2) are played in the summarized video, a case occurs in which the first object (obj1) and the second object (obj2) overlap with each other at a point (referred to as a 'collision point' for convenience of description) (15).

The processor 110 may control the first object and the second object to be played not to overlap with each other at the collision point by two following methods.

In a first method, the processor 110 confirms movement line information for the plurality of objects to be played in the summarized video. Then, when it is confirmed that the first object and the second object overlap with each other at the collision point, the processor 110 rearranges the first object and the second object an interval so that the first object and the second object are played apart by adding a plurality of intervals, that is, a space in one symmetric direction of a horizontal direction and a vertical direction based on the collision point.

In a second method, when the first object and the second object enter the collision point, the processor 110 temporarily reduces an object ratio of a surrounding region based on the collision point. As a result, the first and second objects may be played as if the first and second objects do not collide with each other on the entire summarized video screen. A method in which the processor 110 temporarily reduces a screen ratio or a method for adding the space between the overlapped objects may be performed by various methods and is not limited to one method in the exemplary embodiment of the present invention.

Next, a method for providing the summarized image will be described with reference to FIGS. 11 to 13. In the exemplary embodiment of the present invention, when the processor 110 determines that there is an object that performs an abnormal action (for example, a person who collapses, a person who roams, an accident vehicle, etc.) while analyzing the image stream, the processor may summarize the objects which perform the abnormal actions as single summarized image, and provide the single summarized image to the user. Alternatively, the processor 110 may provide the summarized image when the user wishes to confirm objects that take an action or when the user inputs the selection information for a specific object.

Figure 11:
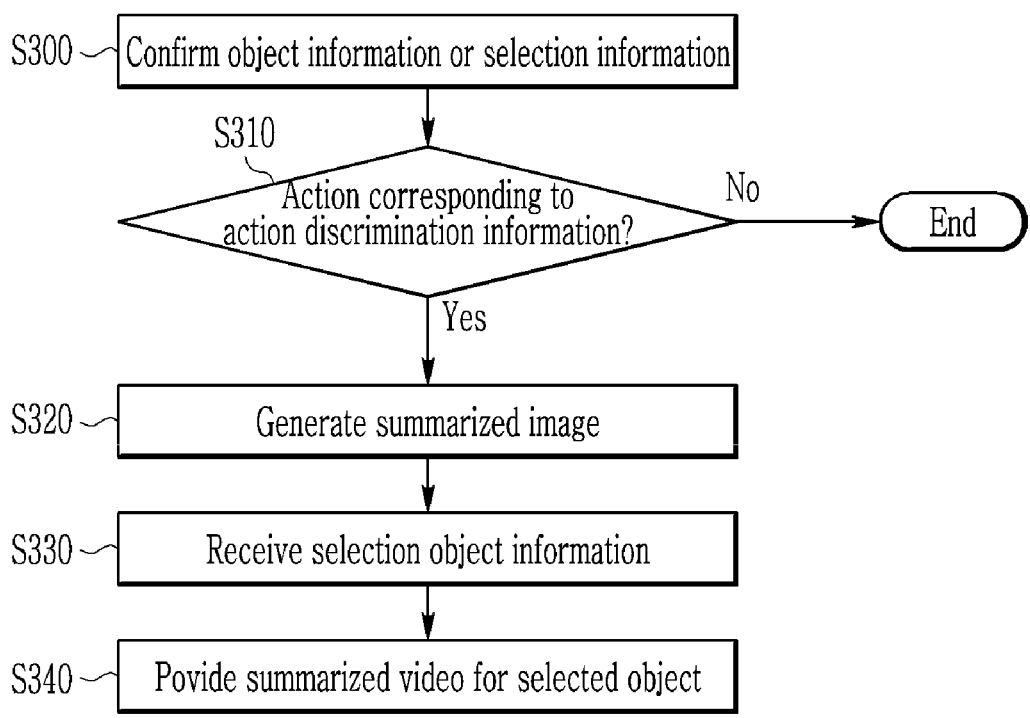
FIG. 11 is a flowchart illustrating a method for providing a summarized image according to an exemplary embodiment of the present invention.

FIG. 11 is a flowchart illustrating a method for providing a summarized image according to an exemplary embodiment of the present invention.

As illustrated in FIG. 11, the processor 110 compares and verifies the action information and the object information stored in the memory 120 during the process of delivering the generated object metadata to the memory 120 (S300). Alternatively, in the process of storing the object metadata in the memory 120, the processor 110 checks whether there is selection information input by the user. Here, the selection information may include action information on a specific action.

In addition, the processor 110 determines whether there is an object that performs the abnormal action or an object that performs a specific action based on the selection information input by the user, based on action discrimination information previously input among the confirmed information (S310). Here, the action discrimination information refers to information in which information depending on the event is obtained in advance for each event.

The event may be divided into an abnormal action such as an action in which the person falls down, an action in which the person fights, an action in which the person runs or abandons an object, an action in which an accident occurs in a vehicle, etc. and a normal action such as an action in which the person walks, an action in which the person passes through a gate, etc. A method for collecting action discrimination information for discriminating the presence or absence of an object that performs the abnormal action or the specific action for each event is already known, so that a detailed description thereof will be omitted in the exemplary embodiment of the present invention.

If it is confirmed that there is no object to take an action for the action determination information among the confirmed objects in step S310, the generation of the summarized image ends. However, when there is the object that takes the action corresponding to the action discrimination information, the processor 110 inserts the object information into the background frame and generates the object information as the summarized image (S320).

Here, when there is a plurality of objects that takes the action, the summarized image may be generated so that the objects do not overlap. The generated summarized image will be described first with reference to FIGS. 12 and 13.

Figure 12:
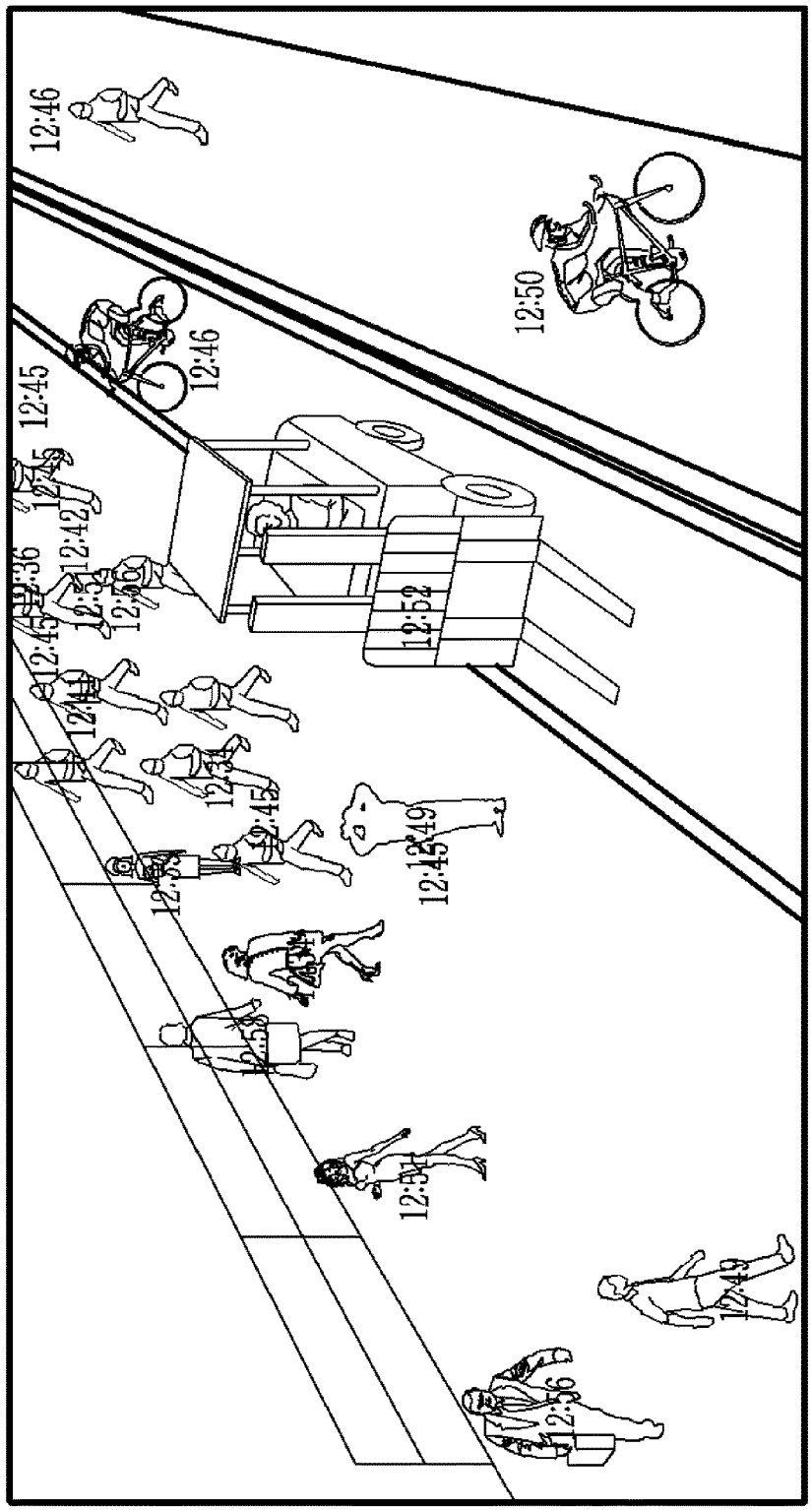
FIG. 12 is an exemplary diagram for object synthesis in the related art.
Figure 13:
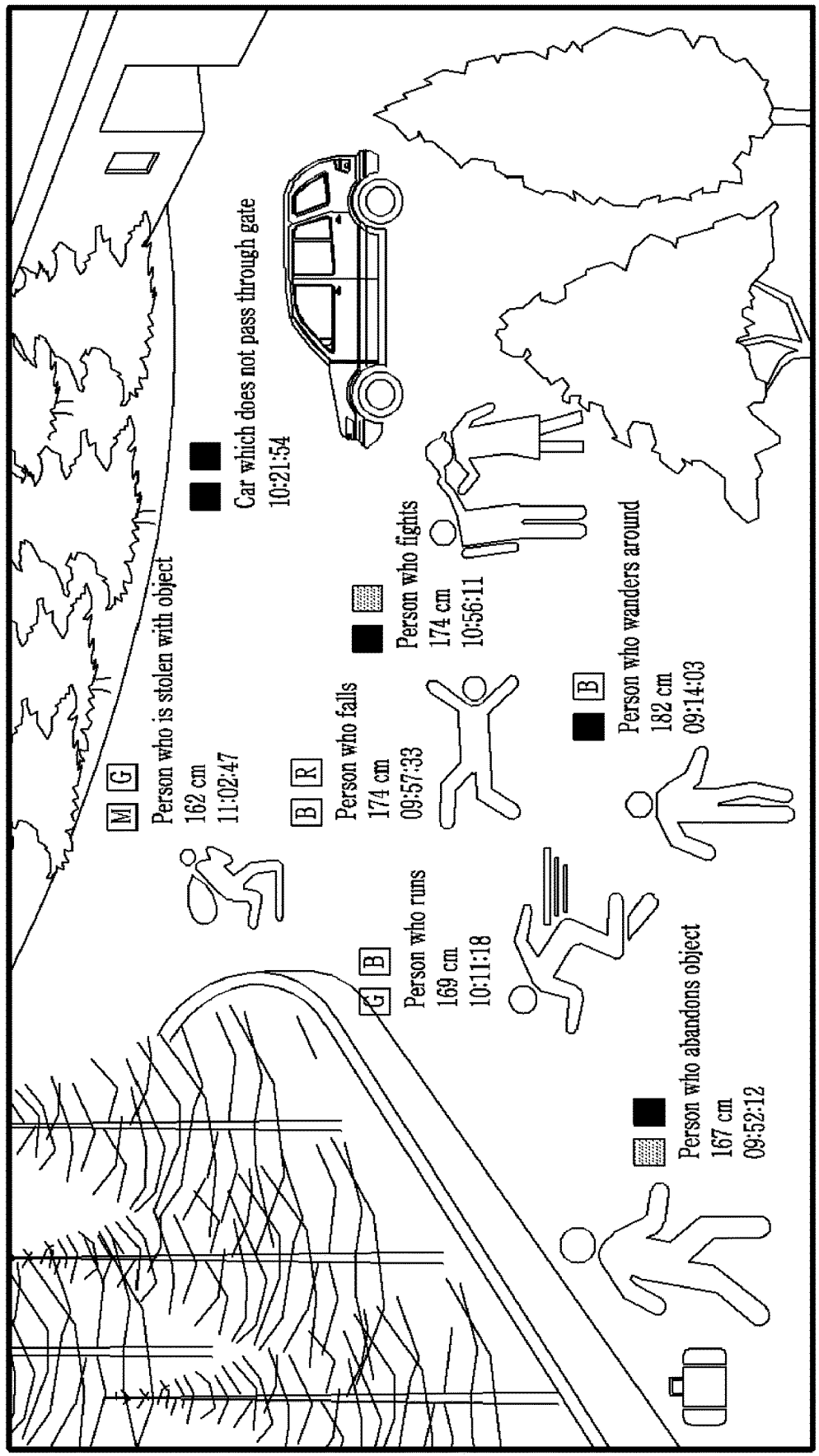
FIG. 13 is an exemplary view illustrating a summarized image according to an exemplary embodiment of the present invention.

FIG. 12 is an exemplary diagram for object synthesis in the related art and FIG. 13 is an exemplary view illustrating a summarized image according to an exemplary embodiment of the present invention.

FIG. 12 illustrates objects passing over a bridge according to a video synopsis in the related art. As illustrated in FIG. 12, since the plurality of objects overlap with each other, it is difficult for the user to identify the objects. In addition, all objects that are simply walking or moving are included and provided, so that the user may miss objects to be controlled.

Therefore, as illustrated in FIG. 13, in the exemplary embodiment of the present invention, the processor 110 may collect only the objects that take the action, and provide the collected objects as the summarized image in advance. In addition, time information for a time when the objects take the actions and object information are included and provided, so that the user may first control the objects without missing the objects.

Although the objects are displayed in an emoticon form in FIG. 13, a shape of an actual object may be provided as the summarized image. In addition, in FIG. 13, only the objects that take the abnormal action are illustrated. However, when the selection information input by the user includes information that the user desires to detect the object that takes the action, the processor 110 may extract only the objects that take the action and provide the extracted objects as the summarized image based on the object metadata information stored in the memory 120.

In addition, the exemplary embodiment of the present invention provides an object representative color representing the object together with the object information. The object representative color as information used when the user searches for the person as the object and in the object representative color, an upper color and a lower color of the object are separately expressed.

It is difficult for the processor 110 to accurately extract an upper body and a lower body of the object Accordingly, in the exemplary embodiment of the present invention, the processor 110 divides the object into an upper region and a lower region based on size information of the object. Then, a value having a largest ratio among RGB values in the upper region and the lower region is extracted as a representative value, and the color is set to an upper color and a lower color.

The object representative color is stored in the memory 120 as the object metadata together with the object identification information, area information, and the like. In the exemplary embodiment of the present invention, it is described as an example that the object representative color is extracted and provided, but various informations may be stored as metadata such as facial feature information, vehicle feature information, etc.

On the other hand, when describing the FIG. 11, if the user confirming the summarized image generated in step S320 selects the object, the processor 110 receives the selected object information (S330). Then, the processor 110 generates the summarized image based on the selected object information, and the display 130 provides the user with a summarized video of the selected object (S340).

Through such a system and such a method, a user who needs to control the CCTV may review only the ROI in a plurality of CCTV images in a short time and set constancy for the number of objects to be monitored, thereby effectively handling a security task.

Further, in the related art, the event may be detected only when there is an original stored image or a real-time image stream and the event may not be detected in the summarized video, while in the exemplary embodiment of the present invention, the processor 110 may detect the event in the summarized video. That is, it is possible to set the ROI in the summarized video and to extract security management related events in the region, for example, detecting an object entering and leaving a building, an object moving in the ROI, a falling object, and the like.

Since it is possible to detect the events through the summarized video, it is not necessary to store an original stored image or a real time image stream, and the original stored image or the real-time image stream may be used for various marketing through the detected events.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A method for summarizing an input image by an image summarization system, the method comprising:
    extracting, from an image stream, objects and a background frame;
    receiving a region of interest set in a predetermined region of the background frame;
    selecting at least one of the extracted objects as a queue object; and
    generating a summarized video based on the queue object, the background frame, and the region of interest,
    wherein extracting the objects comprises:
        detecting a first plurality of objects from a plurality of frames constituting the image stream;
        tracking a valid object in the plurality of frames, the valid object being an object of which a number of times the object is detected among the plurality of frames is greater than a predetermined threshold value, and generating object metadata for the valid object; and
        extracting the objects by using the object metadata for the valid object.

2. The method of claim 1,
    wherein the generating the summarized video comprises:
    controlling a movement speed of objects out of the region of interest and a movement speed of objects in the region of interest differently when the summarized video is played.

3. The method of claim 2,
    wherein the controlling comprises:
    controlling an object, which has entered the region of interest and moves out of the region of interest, to move at a speed before entering the region of interest.

4. The method of claim 2,
    wherein a plurality of regions of interest are set, and
    the method further comprises controlling movement speeds of objects in the plurality of regions of interest differently.

5. The method of claim 1,
    wherein the generating the summarized video comprises:
    generating the summarized video such that only objects corresponding to search information of an object are output in the summarized video, based on the search information of the object to be searched being input as a condition for generating the summarized video.

6. The method of claim 1,
wherein the extracting the background frame comprises:
- selecting a plurality of background candidate frames in the image stream;
- determining whether there is a first object in a first frame, the first frame being one of the plurality of background candidate frames, by using object metadata of the first object, the first object being the valid object;
- comparing an object region of the first frame with an object region of a second frame adjacent to the first frame based on a determination that there is the first object in the first frame; and
- extracting the background frame, by using the first frame and the second frame in which one or more objects are deleted, based on the object region of the first frame not overlapping with the object region of the second frame.

7. The method of claim 1,
wherein the generating the summarized video comprises:
- confirming movement paths for a second plurality of objects played in the summarized video, and arranging one or more objects passing over the region of interest in an order in which the one or more objects enter the region of interest, and generating the summarized video based on the arranged one or more objects.

8. The method of claim 7,
wherein the generating the summarized video further comprises:
- when a plurality of regions of interest are set, confirming the movement paths for the second plurality of objects played in the summarized video, and arranging one or more objects passing over all of the plurality of regions of interest in an order in which the one or more objects pass through the plurality of regions of interest, and generating the summarized video based on the arranged one or more objects.

9. A system for summarizing an input image, the system comprising:
- a memory configured to store program; and
- a processor configured to execute the program to perform extracting objects and a background frame from an image stream, and generating a summarized video based on a queue object, the queue object being selected among the objects, the background frame, and a region of interest set in a predetermined region of the background frame,
- wherein the extracting the objects comprises:
  - detecting a first plurality of objects from a plurality of frames constituting the image stream;
  - tracking a valid object in the plurality of frames, the valid object being an object of which a number of times the object is detected among the plurality of frames is greater than a predetermined threshold value, and generating object metadata for the valid object; and
  - extracting the objects by using the object metadata for the valid object.

10. The system of claim 9,
wherein the processor is further configured to control a movement speed of an object out of the region of interest and a movement speed of an object in the region of interest differently when the summarized video is played.

11. The system of claim 10,
wherein the processor is further configured to extract objects passing over the region of interest as objects of interest, and spread and arrange the extracted objects in a time order in which the extracted objects appear in the image stream.

12. The system of claim 11,
wherein the processor is further configured to control an object, which has entered the region of interest and moves out of the region of interest, to move at a speed before entering the region of interest.

13. The system of claim 12,
wherein a plurality of regions of interest are set, and
wherein the processor is further configured to control movement speeds of objects in the plurality of regions of interest differently.

14. The system of claim 9,
wherein the processor is further configured to generate the summarized video based on an input condition, and
wherein the input condition is at least one of a maximum number of objects to be output to the summarized video or object information of the selected objects to be output to the summarized video.

15. The system of claim 14,
wherein the processor is further configured to select objects corresponding to the input condition as queue objects, and insert the selected objects into a queue.

16. The system of claim 15,
wherein the processor is further configured to assign object information of the queue objects to one object layer of object layers corresponding to the maximum number of objects.

17. The system of claim 16,
wherein the processor is further configured to determine the one object layer and a time interval in the one object layer for each queue object such that the queue objects do not overlap in the summarized video based on movement paths of the queue objects.

18. The system of claim 9,
wherein the processor is further configured to confirm movement paths for a second plurality of objects played in the summarized video respectively, arrange one or more objects passing over the region of interest in an order in which the one or more objects enter the region of interest, and generate the summarized video based on the arranged one or more objects.

19. The system of claim 18,
wherein the processor is further configured to, when a plurality of regions of interest are set, confirm the movement paths for the second plurality of objects played in the summarized video, arrange one or more objects passing over all of the plurality of regions of interest in an order in which the one or more objects pass through all of the plurality of regions of interest, and generate the summarized video based on the arranged one or more objects.

* * * * *